No. 791,004. PATENTED MAY 30, 1905.
A. B. CALKINS.
MATCH SPLINT FORMING MACHINE.
APPLICATION FILED AUG. 14, 1901.

WITNESSES.
H. A. Lamb.
L. R. Hoyt.

INVENTOR.
Almon B. Calkins
By his Atty.
Geo. D. Phillips

No. 791,004. PATENTED MAY 30, 1905.
A. B. CALKINS.
MATCH SPLINT FORMING MACHINE.
APPLICATION FILED AUG. 14, 1901.

WITNESSES.
INVENTOR.

No. 791,004. PATENTED MAY 30, 1905.
A. B. CALKINS.
MATCH SPLINT FORMING MACHINE.
APPLICATION FILED AUG. 14, 1901.

WITNESSES. INVENTOR.
H. A. Lamb. Almon B. Calkins.
L. R. Hoyt By his Atty.
Geo. D. Phillips No. 791,004. PATENTED MAY 30, 1905.
A. B. CALKINS.
MATCH SPLINT FORMING MACHINE.
APPLICATION FILED AUG. 14, 1901.

WITNESSES.
H. A. Lamb.
L. R. Hoyt.

INVENTOR.
Almon B. Calkins.
By his Atty.
Geo. D. Phillips.

No. 791,004. PATENTED MAY 30, 1905.
A. B. CALKINS.
MATCH SPLINT FORMING MACHINE.
APPLICATION FILED AUG. 14, 1901.

WITNESSES.
H. A. Lamb
L. R. Hoyt

INVENTOR.
Almon B. Calkins,
By his Atty,
Geo. Phillips

No. 791,004. Patented May 30, 1905.

UNITED STATES PATENT OFFICE.

ALMON B. CALKINS, OF FRANKLIN, NEW JERSEY, ASSIGNOR TO THE AMERICAN MATCH MANUFACTURING CO., A CORPORATION OF NEW JERSEY.

MATCH-SPLINT-FORMING MACHINE.

SPECIFICATION forming part of Letters Patent No. 791,004, dated May 30, 1905.

Application filed August 14, 1901. Serial No. 72,039.

*To all whom it may concern:*

Be it known that I, ALMON B. CALKINS, a citizen of the United States, and a resident of Franklin, in the county of Essex and State of New Jersey, have invented certain new and useful Improvements in Match-Splint-Forming Machines, of which the following is a specification.

My invention relates to an improvement in match-making machines; and it consists in certain details of construction whereby veneers of wood are automatically fed between magazines carrying cutters, said cutters adapted to cut the strip of veneer into splints and fill the magazines therewith and from whence said splints are fed into plates preparatory to dipping.

To enable others to understand my invention, reference is had to the accompanying drawings, in which—

Its construction and operation are as follows:

1 and 2, Figs. 1, 2, 3, and 4, are the side frames of the machine, 3 the main driving-shaft, 4 and 5 tight and loose pulleys therefor, and 6 a balance-wheel, also mounted on said shaft.

7 is a short vertical shaft mounted in the side bracket 8 and is rotated by the main shaft through the medium of the bevel-gears 9 and 10.

11 is a bevel-gear on the lower end of the vertical shaft 7, meshing with the bevel-gear 12 on the cam-shaft 13.

14, 15, and 16 are cams on shaft 13 for operating the mechanism for feeding the veneer strips from the veneer-chute to the cutters and the splints from the magazines to the splint-receiving plate presently to be more fully described.

17, Figs. 1, 2, 4, 12, and 13, is a chute projecting rearward from the machine, open at its upper end, and is filled with the short pieces or strips of veneers 18.

Figures 12, 14:
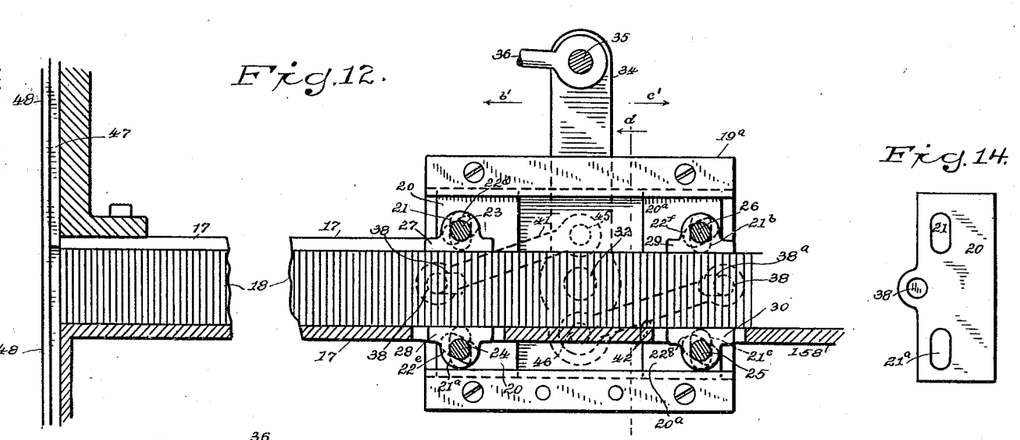
Fig. 12 is an enlarged broken detached side elevation, partly in section, of the feeding-chute for the veneer strips, feeding mechanism for said strips, and plunger for transferring them from the chute to a position between the magazines to be cut into splints.
Fig. 14 is an enlarged detail side elevation of one of the slide-plates connected with the veneer-feeding mechanism.
Figure 13:
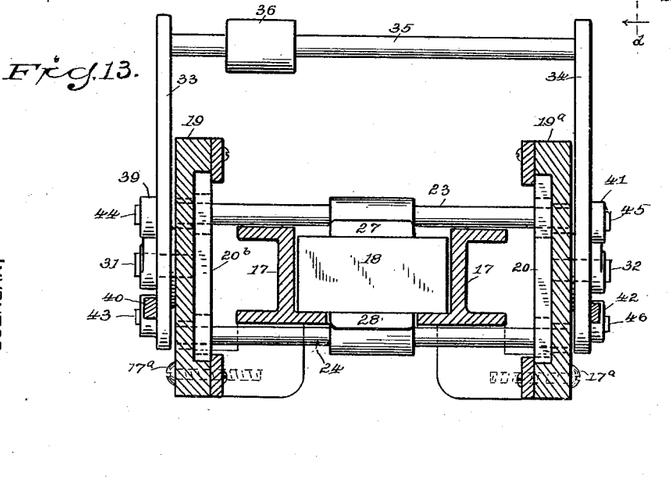
Fig. 13 is a rear end elevation of the veneer-carrier and feeding-chute through line *d* of Fig. 12.
Figure 15:
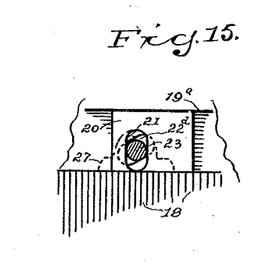
Fig. 15 is a detail side elevation of the upper end of one of the slide-plates, showing the vertical hole therein for one of the pad-carrying shafts, sectional view of said shaft, and broken view of the veneer strips.

19 and 19$^a$ are two side plates connected to the sides of the chute 17 by the screws 17$^a$. 20 20$^a$ 20$^b$ 20$^c$ are four slides operating in said side plates, one of which is shown at Fig. 14. These slides have the vertical slots 21, 21$^a$, 21$^b$, 21$^c$, 21$^d$, 21$^e$, 21$^f$, and 21$^g$. 22, 22$^a$, 22$^b$, 22$^c$, 22$^d$, 22$^e$, 22$^f$, and 22$^g$ are inclined slots in the said side plates. Through these vertical and inclined slots are placed the rods 23, 24, 25, and 26, on which rods are mounted the four feeding-pads 27, 28, 29, and 30, whose lower surface is adapted to engage with the top and bottom edges of the veneer strips 18.

Figure 1:
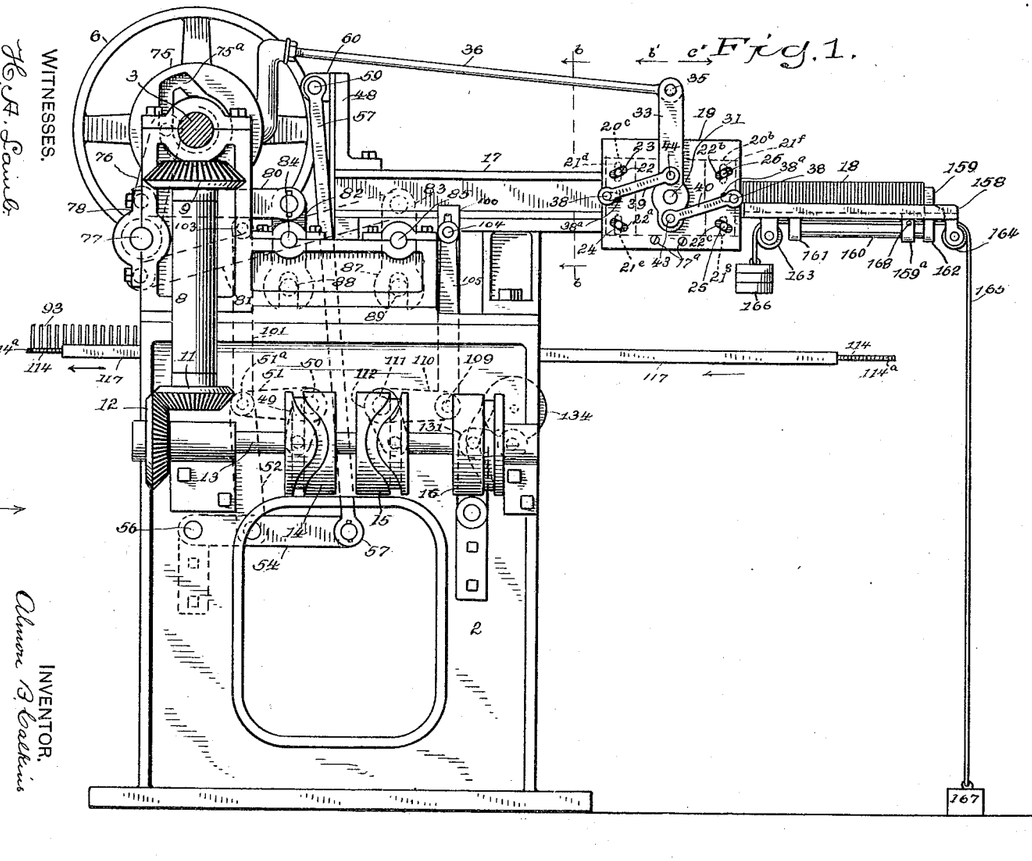
Figure 1 represents a side elevation of the machine and sectional view of the main driving-shaft.

Each of the side plates 19 and 19$^a$ have the outwardly-projecting studs 31 and 32, and on these studs are operatively mounted the two rock-arms 33 and 34 and connected at their upper ends to the rod 35. 36 is an eccentric-rod connected to this rod and also to the eccentric 37 on the main shaft 3. Each of the slides 20, &c., have the outwardly-projecting stud 38, which stud passes through the elongated slots 38$^a$ in the side plates 19 and 19$^a$. On these studs are pivotally supported one end of the four links 39, 40, 41, and 42. The opposite ends of these links are pivotally supported on the studs 43, 44, 45, and 46, projecting from the rock-shafts 33 and 34. When, therefore, the rock-shafts, Figs. 1 and 12, are rocked in the direction of arrow $b'$, the upper links 39 and 41 will move the slides 20 and 20$^c$ forward and cause the rods 23 and 24 to move forward in the inclined slots of the side plates, and thus bring the face of the pads 27 and 28 against the top and bottom edges of the veneer strips and move said strips along the feeding-chute. This forward movement of the rock-arms will, by reason of the connection of the lower links 40 and 42 with the slides 20$^a$ and 20$^b$, before mentioned, cause the rear pads 29 and 30 to move diagonally away from the veneer strips. The reverse movement of the rock-arms in the direction of arrow $c'$ will elevate the front pads and bring the rear ones in contact with the veneer strips. This alternate movement of the pads will give a continuous feeding impetus to the veneer strips. This forward feeding of the veneer strips will carry the end one of these strips under the vertically-operating plunger 47, Fig. 12, which will carry said strip down between the magazines. (Shown at Fig. 5 and presently to be described.)

Figure 2:
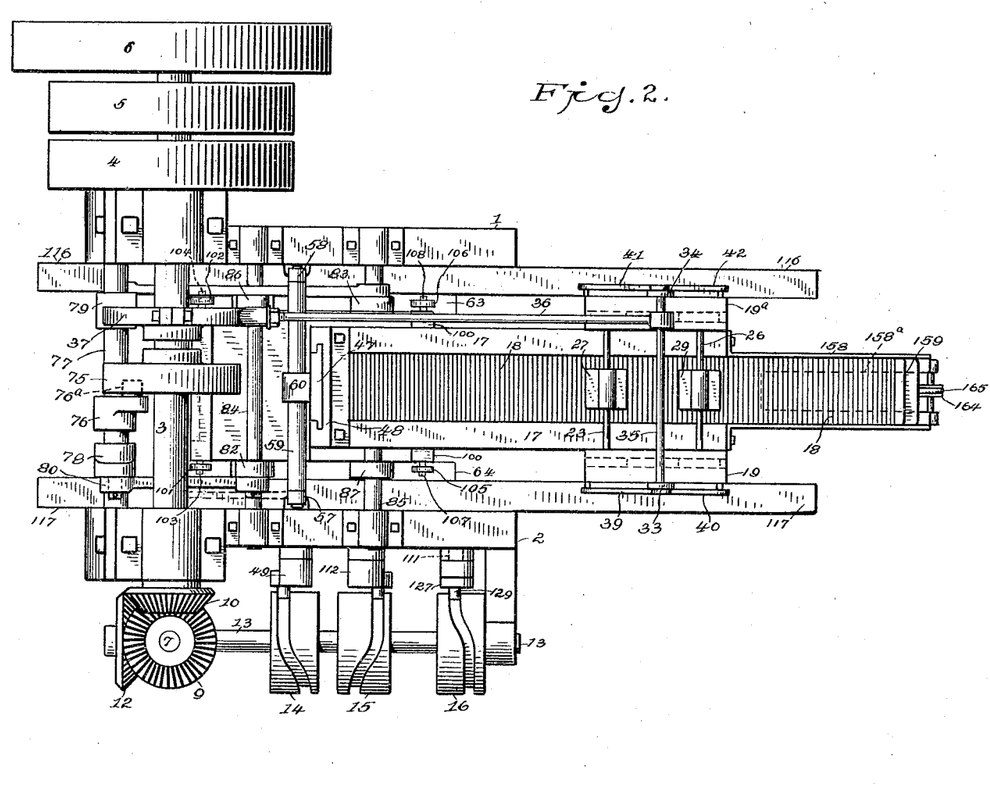
Fig. 2 is an upper plan view of the machine.
Figure 3:
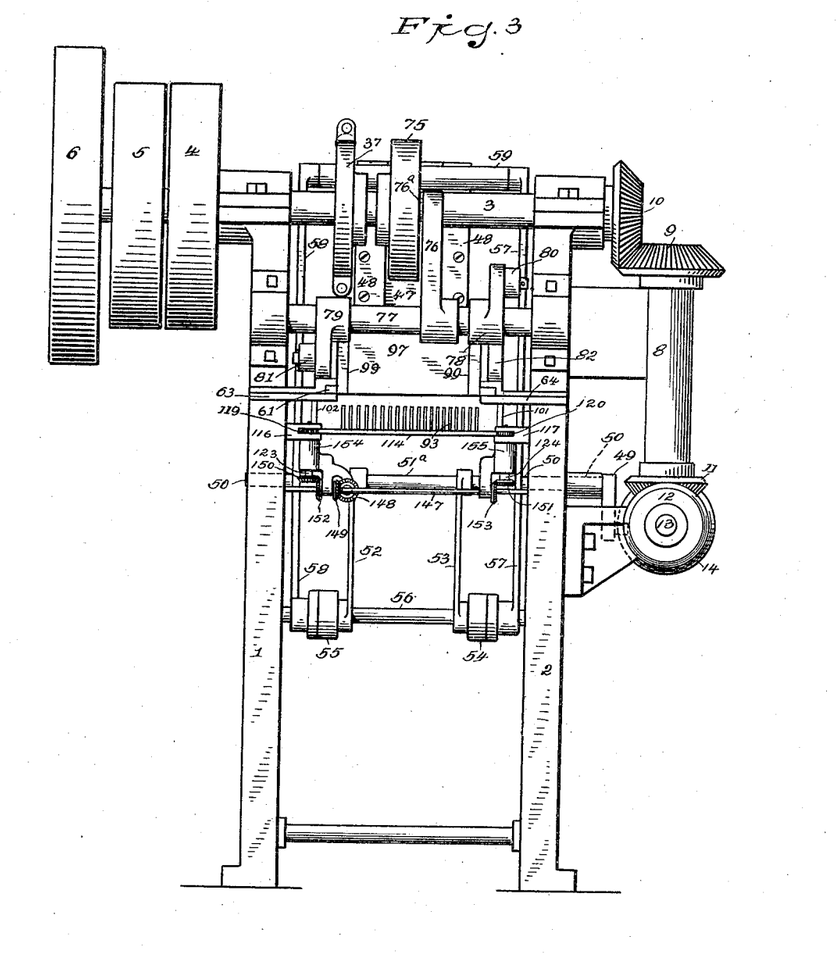
Fig. 3 is a front elevation of the machine looking in the direction of arrow *a* of Fig. 1.

The plunger 47 is mounted in the grooved frame 48 and is operated as follows: 49, Figs. 1, 2, and 3, is an arm mounted on the shaft 50, journaled in the side frames of the machine. The lower end of this arm carries a roll to engage with the groove of the cam 14, by means of which shaft 50 is oscillated. 51 is one of a pair of arms (shown only at Fig. 1) also mounted on shaft 50. The outer ends of these arms carries the rod 51$^a$, to which rod is pivotally supported the upper ends of the links 52 and 53. The lower ends of these links are pivoted to the arms 54 and 55, which arms are in turn pivotally supported to the shaft 56. On the outer ends of arms 54 and 55 are pivotally connected the lower ends of the long links 57 and 58, while their upper ends are pivotally connected to the outer ends of the rod 59, mounted in the lug 60, projecting from the plunger 47. Through the mechanism just described the said plunger is automatically operated to carry the veneer strips down to the cutters.

Figure 5:
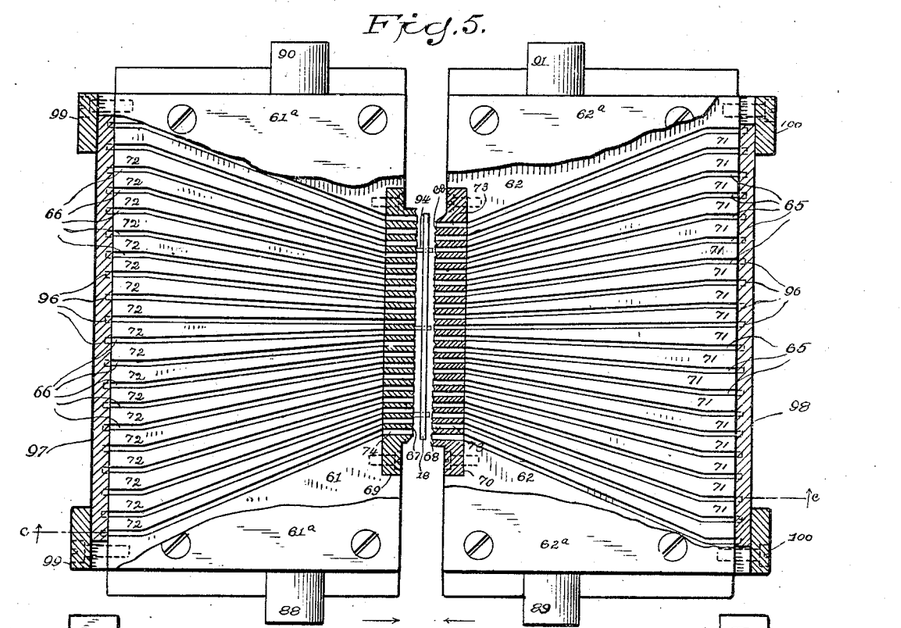
Fig. 5 is an enlarged detail upper plan view of the two magazines carrying cutters, said magazines and cutters shown open with a veneer strip in position to be cut into splints, broken view of the overlying plates of the magazines, and sectional view of the splint-carriers through lines *a'* of Fig. 6.
Figure 6:
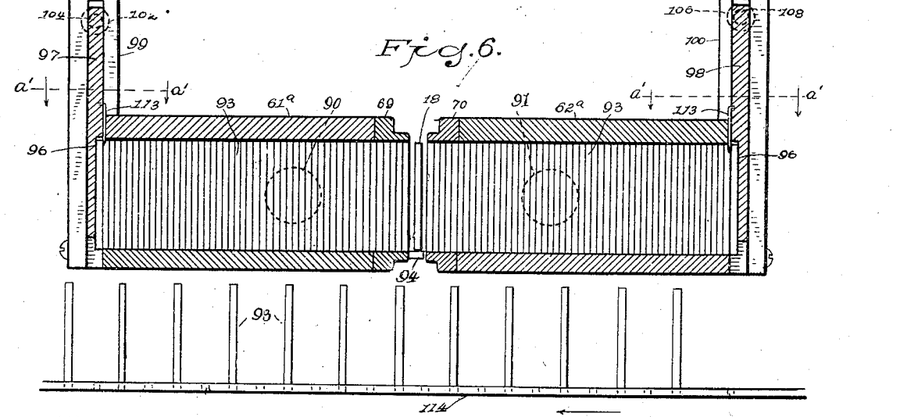
Fig. 6 is an enlarged longitudinal sectional view of the magazines and splint ejectors or carriers through line *c* of Fig. 5, showing the outer runway or groove in the magazines filled with splints, broken view of the plate for holding the splints carried down from the magazines.

Referring particularly to Figs. 5, 6, and 7, 61 and 62 are two magazines reciprocally arranged with respect to each other, and they are supported and operatively mounted in the guideways 63 and 64, Figs. 3 and 5. These magazines are provided with the grooves 65 and 66, adapted to hold splints or sections cut from the veneer strips. 61$^a$ and 62$^a$ are plates to cover said grooves. 67 and 68 are cutters integral with the plates 69 and 70, which plates are secured to the front face of the magazines and are supported by the front faces or edges of the partitions 71 and 72 of said magazine. The spaces 73 and 74 between these cutters will coincide with the grooves of the magazines. It will be understood, however, that instead of making separable cutters, as shown, the ends of the magazine-partitions could be formed into cutting-faces; but the detachable feature of these cutters enables them to be removed and sharpened or replaced by new ones. These magazines are reciprocated to and from each other by means of the following mechanism, viz: 75, Figs. 1, 2, 3, and 7, is a face-cam mounted on the main shaft 3, and 76 is an arm carrying the roll 76$^a$ to engage with the groove 75$^a$ of said cam. This arm is secured to the shaft 77, journaled in the side frames of the machine. 78 and 79 are two shorter arms secured to said shaft, whose outer ends are pivotally connected to the levers 80 and 81. The opposite ends of these levers are pivoted to the upper ends of the rock-arms 82 and 83, (see more particularly Fig. 7,) which arms are secured to the shafts 84 and 85, journaled in the side frames of the machine. The long lever 81 has the elongated hole 81$^a$ to enable it to straddle the shaft 84 and operate freely and not come in contact with said shaft. On said shafts 84 and 85 and opposite the levers 82 and 83 are the short levers 86 and 87. All of these levers—viz., 82, 83, 86, and 87—are forked at their lower ends and are adapted thereby to embrace the four trunnions or studs 88, 89, 90, and 91, Fig. 5, projecting from the sides of the magazine.

Figure 7:
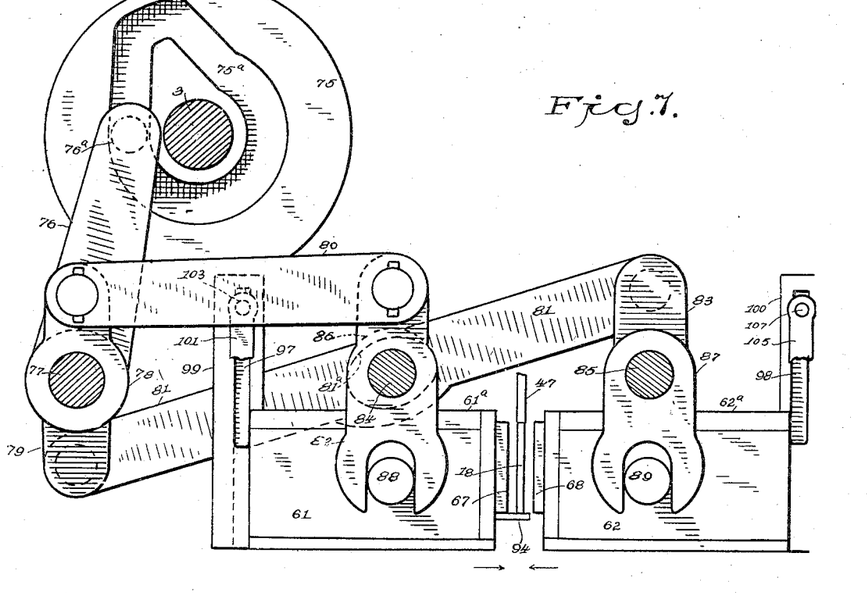
Fig. 7 is an enlarged side elevation of the magazines and mechanism for operating them and sectional view of the several shafts on which such mechanism is mounted.
Figure 8:
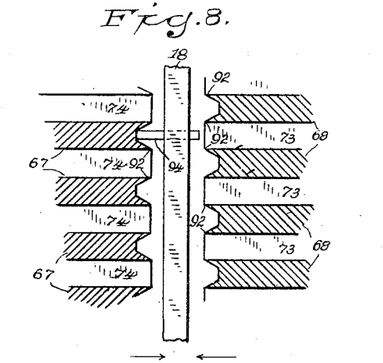
Fig. 8 is an enlarged broken upper detail sectional view of the oppositely-positioned cutters of the magazines opened and section of a strip of veneer in position to be cut into splints.
Figure 18:
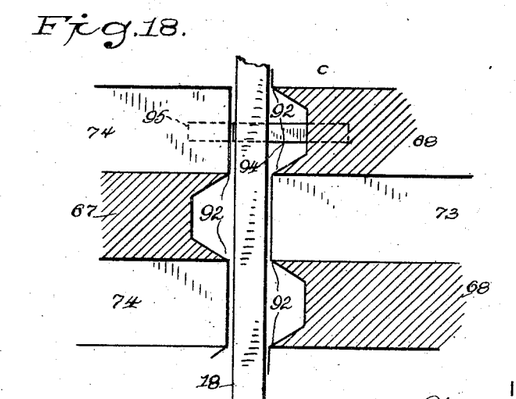
Fig. 18 is an enlarged broken view of the upper face of the veneer-cutters with a section of a veneer strip between them.

When one of the veneer strips 18 has been deposited between the cutters, as shown at Figs. 5, 6, 7, 8, and 9, the magazines are brought toward each other so as to bring the sharp edges 92 of the cutters in contact with the sides of the veneer strip. It will be observed that the cutters 67, Figs. 8 and 18, are arranged in line with the grooves or spaces 73 of the opposite magazine, and the cutters 68 are in line with the grooves or spaces 74, so that when their cutting edges have passed through the veneer strip said strip will have been separated into the several individual splints 93, Fig. 6, the cutters 67 forcing the splints they have cut into the grooves 65, Fig. 5, of the magazine 62 and the cutters 68 will have forced their splints into the grooves 66 of the magazine 61, thus cutting the veneer strip into splints without any waste or scrap.

Figure 9:
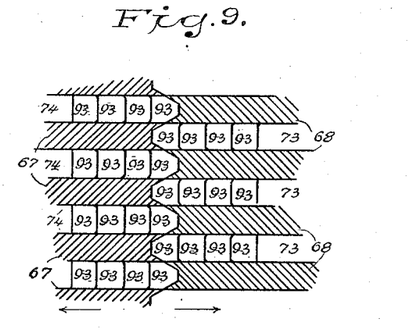
Fig. 9 is a view similar to Fig. 8, showing the interlocking of the cutters and the veneer severed into splints.
Figure 10:
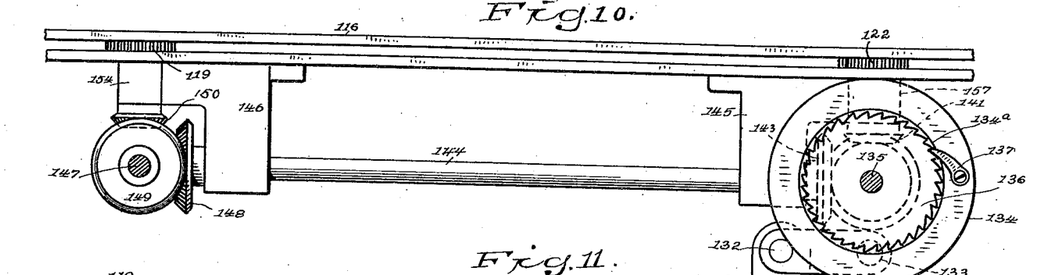
Fig. 10 is an enlarged detached side elevation of the propelling mechanism for operating the splint-receiving plate, also broken view of one of the side guides therefor.

It will be observed, Fig. 9, that the cutters travel forward no farther than will carry them through the veneer strip 18, although the cutters could pass each other farther than shown, if desired.

94 (see Figs. 5, 6, 7, 8, 17, and 18) represents pins let into the front face of the cutter-plates just below the edges of the cutters to support the veneer strip 18. 95 is a hole in the opposite cutter-plate for these pins to enter when the magazines are brought together.

Figure 4:
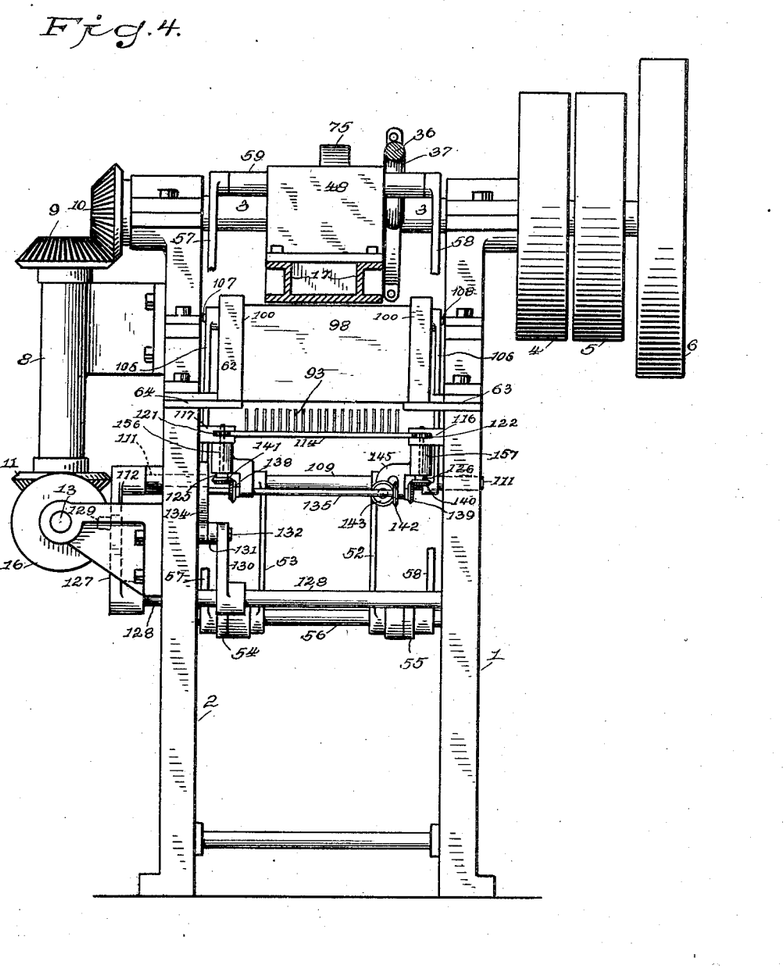
Fig. 4 is a rear elevation of the machine and sectional view of the veneer-feeding chute through line *b* of Fig. 1, sectional view of the eccentric-rod for operating the feeding mechanism of said chute, and broken view of the links for operating the veneer-carrying plunger.
Figure 16:
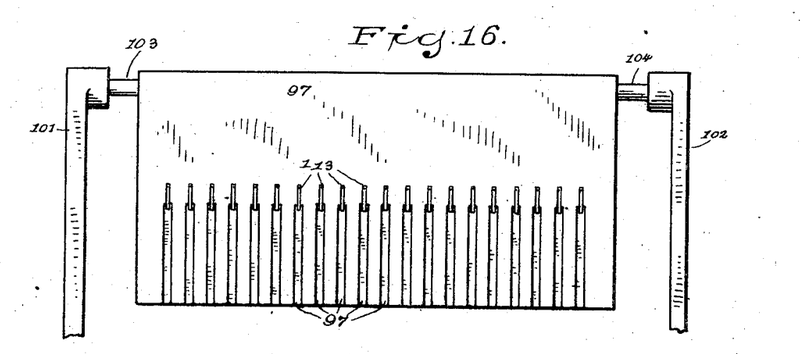
Fig. 16 is an enlarged detail side elevation of one of the magazine splint-carriers.
Figure 17:
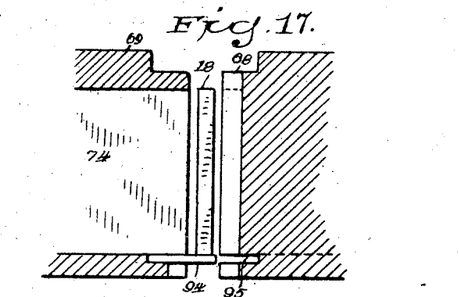
Fig. 17 is an enlarged broken side elevation of the veneer-cutters with a veneer strip between them in position to be cut into splints.

As the outer grooves in the magazines are longer than the center ones, it will be necessary when first starting the machine to fill the grooves by hand, after which the cutters will always keep the grooves filled. The grooves being full, it is evident that when the cutters force in a fresh supply of splints the whole body of splints will be moved rearward and crowd the row of outer ones into the open grooves 96, Figs. 5, 6, and 16, of the sliding carriers 97 and 98. These sliding carriers are vertically operated for the purpose presently to be described in the housings 99 and 100 on the outer ends of the magazines, and the number of grooves therein will correspond to the number of grooves in each of the magazines. These carriers are operated through the medium of cams 14 and 15, Fig. 1. The lower ends of the links 101 and 102, Figs. 2, 7, and 16, are pivotally supported on the rod 51ᵃ, Figs. 1 and 3. One end of this rod is supported, as before mentioned, in the outer ends of the two arms, one only, 51, being shown at Fig. 1, mounted upon the shaft 50. The upper ends of these links 101 and 102 are pivotally supported on the pins 103 and 104, projecting from the carrier 97, Fig. 2. The rocking movement of the arms carrying the rod 51ᵃ will of course vertically operate said carrier 97. The opposite carrier 98, Figs. 1, 2, 5, 6, and 7, has the links 105 and 106 pivotally on the pins 107 and 108, projecting from said carrier. The lower ends of these links are pivotally supported on the rod 109. (Shown at Figs. 1 and 4.) This rod is mounted in the outer ends of two arms, one of which arms—viz., 110—is shown only at Fig. 1. These arms are mounted upon the shaft 111. On the outer end of this shaft, Figs. 1, 2, and 4, is the arm 112, whose lower end carries a roll to engage with the groove in the cam 15. Thus by means of this mechanism just described the carrier 98 is operated.

Over each of the grooves in the carriers 97 and 98 (see Figs. 6 and 16) are the thin springs 113, whose purpose is to hold the splints temporarily in said grooves for the purpose presently to be described. 114 (see Fig. 11) is a movable splint-plate having the holes 115 to receive the ends of the splints carried down from the magazines. When the outer row of splints in the magazines are forced into the grooves 96 in the carriers 97 and 98, said carriers will be at the extreme upper end of their stroke, and the lower ends of the retaining-springs will be above the upper ends of said splints, and thus enable said splints to freely enter said grooves. When, therefore, the carriers descend, these springs will embrace (see Fig. 6) the upper ends of said splints and hold them in the grooves of said carriers until said carriers have descended and forced the lower ends of said splints into the holes of the splint-plate 114. These holes are small enough to enable the splints to remain there after the carriers are withdrawn. The number of holes in each transverse row of holes in the plate equal the number of grooves in the magazines and the splint-carriers 97 and 98.

The splint-plate 114, Figs. 1, 3, 4, 10, and 11, is slidably mounted in the grooved supports 116 and 117. Rack-teeth 114ᵃ are formed on each edge of this plate to be engaged by the four pinions 119, 120, 121, and 122. These pinions are mounted on the upper end of the short vertical shafts 123 124 125 126. These pinions are operated through the medium of the cam 16. (See also Figs. 2 and 4.) 127 is an arm mounted on the shaft 128, which shaft is journaled in the side frames of the machine. The upper end of this arm carries the roll 129, adapted to engage the groove of the cam 16, which engagement will give a rocking movement to the shaft 128. On this shaft and between said side frames, Fig. 4, is the arm 130, carrying the short rearwardly-projecting link 131. (See also Figs. 1 and 10.) One end of this link is pivotally supported on the pin 132 of the arm 130, and the other end is pivoted to the pin 133 of the rotatable pawl-carrying plate 134. This plate is rotatably mounted on the small shaft 135. (Seen also at Fig. 4.) 136 is a ratchet-wheel fixed to said shaft and partially embraced by the recess 134ᵃ of the plate 134. 137 is a pawl on said plate, adapted to engage the teeth of wheel 136 and rotate the shaft 135 through the movement of the cam 16.

Figure 11:
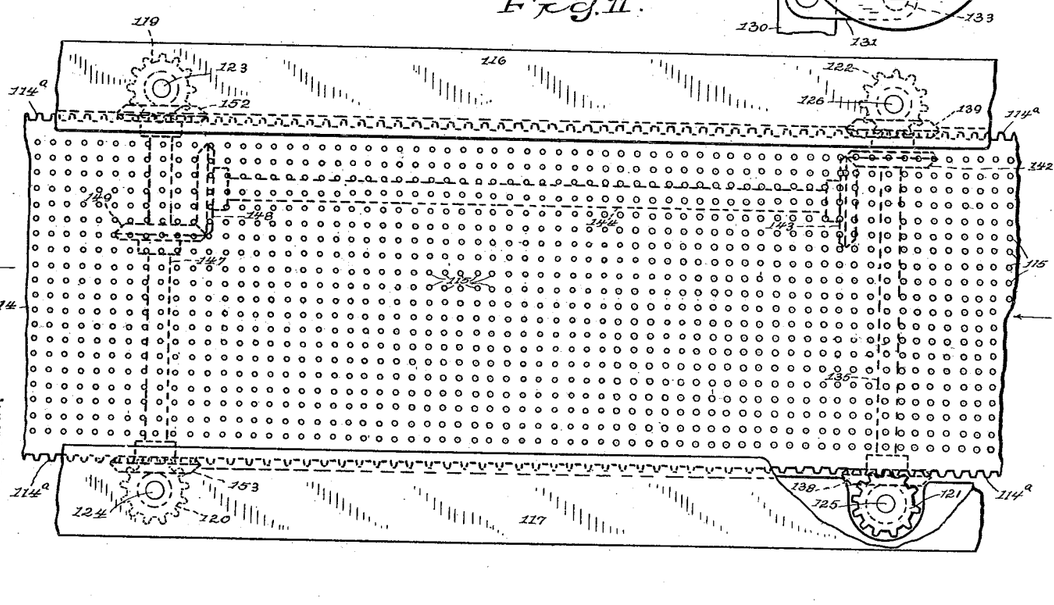
Fig. 11 is an enlarged broken upper plan view of the splint-receiving plate, side guides, and propelling mechanism therefor.

The shaft 135 carriers the bevel-gears 138 and 139, Figs. 4 and 11, to register with the bevel-gears 140 and 141, mounted on the lower end of the short vertical shafts 125 and 126. The upper ends of these shafts carry, as before mentioned, the pinions 121 and 122, registering with the teeth of the splint-carrying plate 114. 142 is a bevel-gear on shaft 135, registering with the bevel-gear 143 on the shaft 144, (see also Fig. 10,) mounted in the supports 145 and 146. This shaft 144 transmits motion from shaft 135 to the shaft 147 (seen also at Fig. 3) through the medium of the before-mentioned bevel-gear 143 and also the bevel-gear 148, which latter gear registers with the bevel-gear 149 of said shaft 147. Motion is communicated to the other short vertical shafts 123 and 124, carrying the other two rack-pinions 119 and 120, through their bevel-gears 150 and 151 and the bevel-gears 152 and 153 on shaft 147. 154, 155, 156, and 157, Figs. 3 and 4, are brackets for supporting these four short vertical pinion-shafts.

At the rear of the machine, Figs. 1 and 2, is an arrangement for moving the veneer strips 18 forward to the feeding-pads 27, 28, 29, and 30. 158 is an extension of the feeding-chute 17, and it is filled with the veneer strips 18. 159 is a traveler mounted on said extension and adapted to push against the said veneer strips. The lower end 159$^a$ of this traveler slides on the rod 160, mounted in the brackets 161 and 162, projecting down through the opening 158$^a$ of the extension 158. 163 and 164 are grooved pulleys carrying the cord 165, the free end of which cord carries the weight 166, while the other end is secured to the treadle 167. This cord is also attached to the lower end 159$^a$ of the traveler 159 by means of the pin 168, so that when the traveler has been moved forward any distance within its range of travel by the weights the operator will place his foot on the treadle and bring it back, so as to insert a fresh supply of veneer strips.

The automatic operation of the machine above described feeds the veneer strips along the chute and deposits one of said strips between the magazine-cutters when said magazines are in an open position. Then the magazines are moved toward each other a distance sufficient for the cutters to cut the veneer strip into sections or splints and at the same time force said splints in opposite directions into the grooves of the magazines. Immediately on the return of the magazines to their open position the splint-carriers descend and carry one splint from each of the grooves of the magazines and forces said splints into the movable splint-carrying plate below said magazines.

The supports 116 and 117 project far enough to the rear of the machine to admit a second plate when the first has traveled a certain distance, so that just as soon as the rear end of first plate has left the driving-pinions 121 and 122, Fig. 11, the second plate will be instantly engaged by said pinions and be carried along with the first plate. In this way there will always be a plate ready to receive the splints brought down from the magazines. When the forward plate has left the pinions 119 and 120, it is taken out and sent to the dipping-vat.

The gist of my invention lies in the two co-acting magazines carrying splint-forming cutters on their front face with grooves between said cutters extending entirely through said magazines and running rearward in diverging lines each side of the central groove combined with splint-ejectors located at or near the rear of the magazines and operatively mounted thereon, so that by means of the permanent attachment of the ejectors with the magazines the splints are always kept in alinement with said ejectors, and this feature—viz., the magazines carrying their own ejectors—will apply whether one or both magazines are used. I do not, however, wish to be confined to the exact mechanism for operating the magazines, as this can be varied, if desired.

Having thus described my invention, what I claim as new, and desire to secure by Letters Patent, is—

1. The combination, in a machine for cutting match-splints, of a chute for holding veneer strips, means for feeding said strips therein, consisting of two sets of movable pads adapted to engage the upper and lower edges of said strips, each set adapted to engage, alternately, means for operating said pads, for the purpose set forth.

2. The combination, in a machine for cutting match-splints, of a chute for holding veneer strips, means for feeding said strips, consisting of movable slides having vertically-elongated holes therein, supports for said slides having elongated holes inclined to the vertical holes of said slides, rods passing through said holes, feeding-pads mounted on said rods and adapted to engage the upper and lower edges of said strips, each set adapted to engage alternately, for the purpose set forth.

3. The herein-described improvement in a machine for forming match-splints, comprising a magazine having splint-forming cutters on one face, grooves or channels between said cutters running through the magazine and adapted to hold splints in parallel relation to each other, a support at the bottom of said grooves for the end of said splints, said grooves running rearward in diverging lines each side of the central groove of the magazine so that the distance between said grooves at the rear of the magazine will exceed the distance between said grooves at the front or cutting face for the purpose set forth.

4. The combination, in a machine for forming match-splints from veneer strips, comprising two reciprocally-operating magazines carrying cutters on their front faces, splint grooves or channels between said cutters extending through said magazines and adapted to hold splints in parallel relation to each other, a support at the bottom of said grooves for the end of said splints, said grooves running rearward in diverging lines each side of the central groove so that, the distance between the grooves at the rear of the magazines will exceed the distance between the grooves at the front, splint-ejectors operatively mounted on said magazines and at the rear thereof, for the purpose set forth.

5. The combination, in a machine for forming match-splints from veneer strips, of splint-holding magazines carrying cutters on their opposing faces with grooves between said cutters running entirely through the magazines, said grooves running in diverging lines each side of the central one of said grooves, said magazines adapted to reciprocate to and from each other to sever the veneer strip into splints and force them sidewise into and through the grooves of each magazine and to the rear thereof, each magazine carrying its own splint-ejectors operatively mounted at the rear thereof, for the purpose set forth.

6. The combination, in a machine for cutting match-splints from veneer strips, of reciprocally-operating magazines arranged on each side of the cutting field and having cutters on their opposing faces, grooves between said cutters running entirely through said magazines, said grooves running in diverging lines each side of the central one of said grooves, the cutters from one magazine forcing the splints sidewise into the grooves of the opposite magazine and so on through said grooves and out of the magazines at the rear thereof splint-ejectors operatively mounted on each of said magazines adapted to engage the splints discharged from said grooves and deposit them out of line with said magazines, for the purpose set forth.

7. The herein-described improvement in a machine for forming match-splints, comprising a magazine having splint-forming cutters on one face, grooves or channels between said cutters running through said magazine and in lines diverging each way from the central and straight groove, said grooves adapted to hold splints in parallel relation to each other, a support at the bottom of said grooves for the ends of said splints, said splints adapted to be moved along said grooves and away from the cutters by the crowding of one splint against another and adapted to be discharged at the rear of the magazine, for the purpose set forth.

8. The combination, in a machine for forming match-splints from veneer strips, of magazines having cutters on their front face and grooves between said cutters running through said magazines and in lines diverging each way from the central or straight groove, means for operating both of said magazines to and from the cutting field so that, a veneer strip in said field will be divided into splints and such splints forced in opposite directions from said field into the grooves of each manazine, splint-ejectors operatively mounted on each magazine at or near the rear thereof, combined with a traveling splint-carrying plate to receive the splints ejected from said magazines, for the purpose set forth.

9. The herein-described magazine having radially-disposed grooves for holding match-splints side by side and adapted to be discharged at the rear of said magazine, the grooves on each side of the center being proportionally deflected from the radial line so that the splints will be ejected on a line parallel with the cutters, for the purpose set forth.

10. The combination, in a machine for forming match-splints, of double magazines, each having splint-carrying grooves running therethrough, cutters on their vertical front faces, said magazines located on each side of the cutting field and adapted to operate to and from said field, the cutters of one magazine facing the grooves of the opposite magazine, splint-carriers operatively connected to the rear of said magazines, grooves or recesses in said carriers and in line with the grooves of said magazines and adapted to hold a splint from each of said magazine-grooves, means for operating said carriers to deposit said splints outside of said magazine, for the purpose set forth.

11. The combination, in a machine for making match-splints, of a grooved magazine carrying cutters on its front face and between said grooves, a reciprocating sliding splint-carrier at the rear of the magazine, said carrier having recesses on its inner face and on a line with said grooves, said recesses adapted to receive a splint from each of said grooves and said splints deposited by said carrier outside of said magazine, for the purpose set forth.

12. In a machine for making match-splints, the combination with a grooved magazine carrying cutters on its front face, and a reciprocating sliding splint-carrier on its rear face, said carrier having splint-receiving recesses opposite the magazine-grooves, means, in connection with said recesses, for temporarily retaining said splints therein when said splints are transported outside of the magazine by said carrier, for the purpose set forth.

13. The combination, in a machine for forming match-splints comprising the following elements, viz: mechanism for feeding veneer strips, mechanism for transferring said strips from the feeding line of said strips to the cutting field, grooved magazines carrying cutters arranged on each side of the cutting field and adapted to reciprocate to and from said field and cut splints from the veneer strips and force said splints into said grooves, said grooves extending through the magazine so that, the splints received at one end of the magazines are crowded in series in and through the other end of said magazines, a traveling splint-holding plate outside of the magazines, ejectors on said magazines adapted to discharge the splints from the magazines to said plate, for the purpose set forth.

Signed at Passaic, in the county of Passaic and State of New Jersey, this 15th day of May, A. D. 1901.

ALMON B. CALKINS.

Witnesses:
PAUL W. MULLER,
GEORGE J. LITTLE.